Oct. 5, 1965  K. BURGSMUELLER  3,209,652
THREAD WHIRLING METHOD
Filed March 30, 1961  2 Sheets-Sheet 1
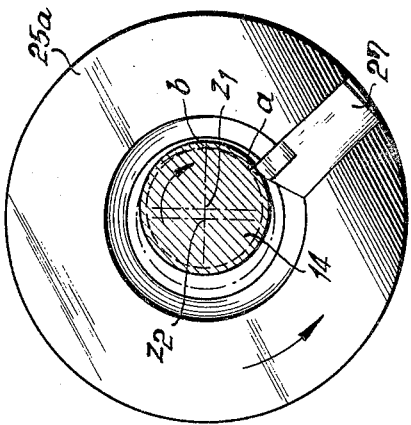
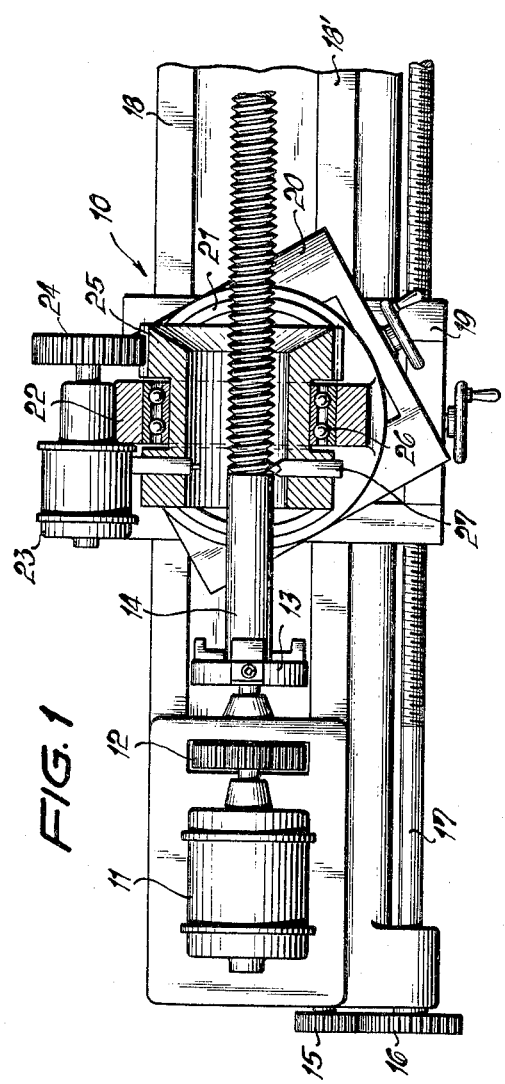
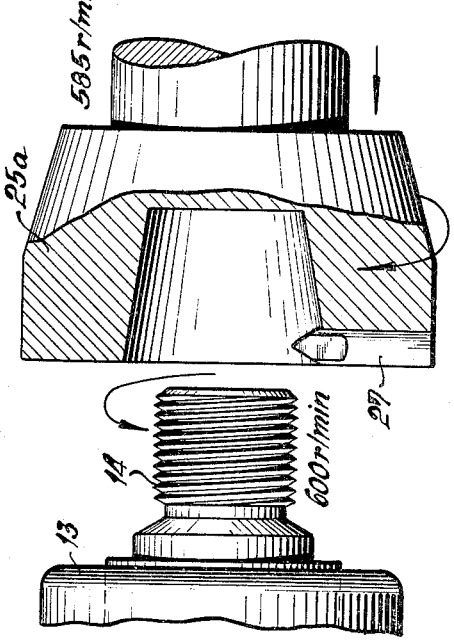
INVENTOR
KARL BURGSMUELLER

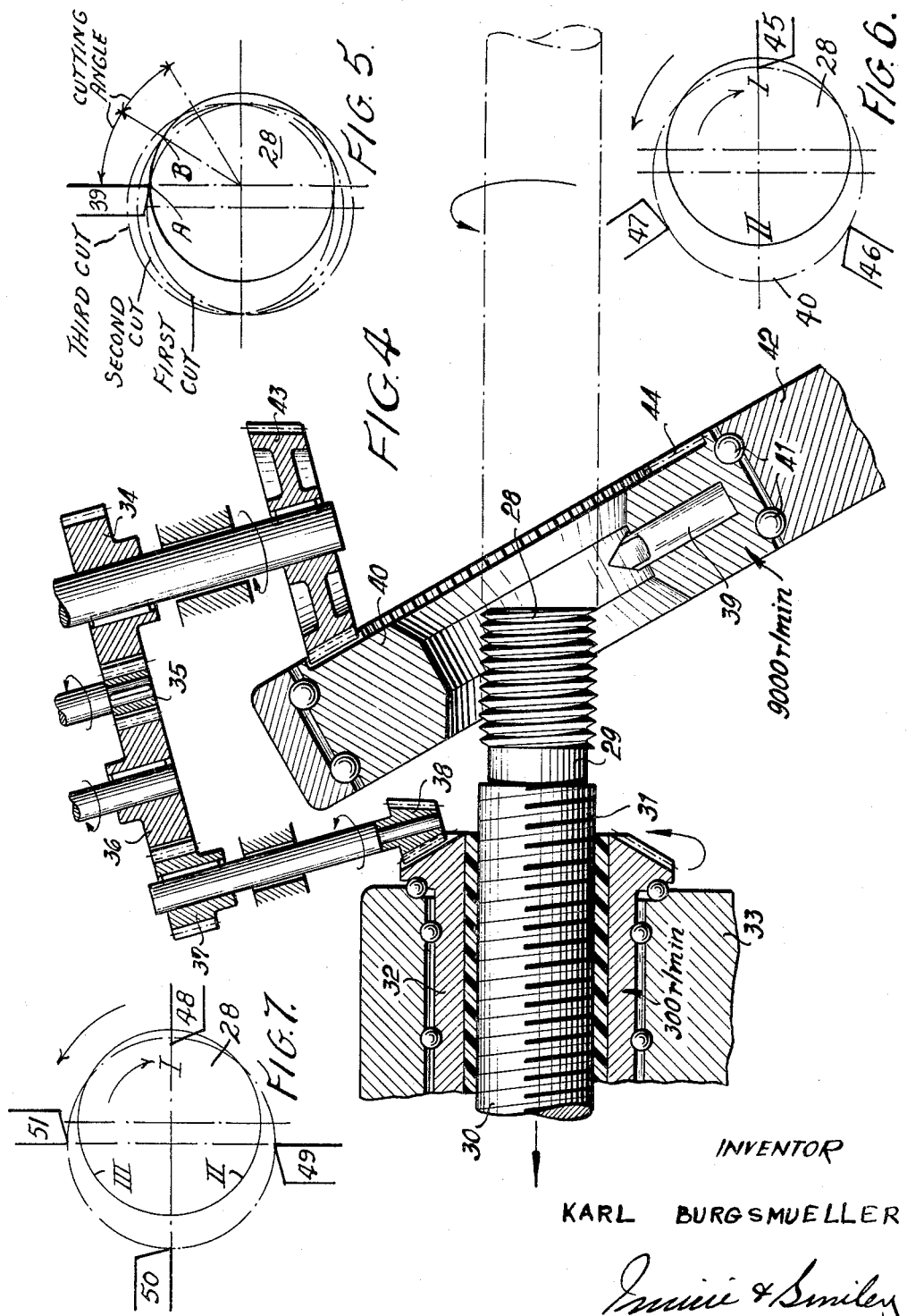

United States Patent Office 3,209,652
Patented Oct. 5, 1965

3,209,652
THREAD WHIRLING METHOD
Karl Burgsmueller, Haus Hainberg, Kreiensen,
Harz, Germany
Filed Mar. 30, 1961, Ser. No. 99,616
10 Claims. (Cl. 90—11.42)

The present invention concerns a method of whirling internal and external threads, including worms, on workpieces revolving at high speed and apparatus therefor. This method and apparatus are also suitable for whirling multiple threads including such having a steep pitch. The method may also be carried out in combination with conventional machining of workpieces on lathes and the like, e.g. automatic lathes and turret lathes.

In known thread whirling methods and as described in the U.S. patent specification No. 2,749,808 the tool is guided longitudinally relative to the workpiece axis and simultaneously revolves at a comparatively high speed eccentrically to the slowly revolving workpiece. With each revolution the tool removes a short chip from the workpiece. With each cut of the tool the thread is machined in a certain angular cutting region to the final depth and the final profile. This whirling method and an apparatus suitable therefor are also described in detail in the U.S. patent specification Nos. 2,713,282, 2,739,510 and 2,691,921 which should be regarded as indicating the state of the art relative to the following description.

In these known whirling methods the workpiece is rotated at low speed whilst the tool revolves around it at a multiple of generally about one hundred times, the speed of rotation of the workpiece. Thus, it is not possible to employ the known thread whirling methods simultaneously with, or immediately before or after, other machining operations whilst the tools are at a standstill on the same workpiece on the same lathe, because for reasons of economy these conventional machining operations, such as, for example, turning or boring involve higher speeds of workpiece rotation, which would then have to be again reduced during the thread whirling operation. Such speed changes are cumbersome even on simple machines and on complicated turret lathes they are particularly time consuming and interrupt the normal cycle of operations. Hence, for the same reasons, on automatic multi-spindle lathes such conventional machining operations and thread whirling operations cannot be carried out either simultaneously or in immediate succession to one another.

It is thus principally an object of the invention in the case of high speed workpieces to synchronize the speed of the tool in such a manner that the speed requirement for thread whirling is substantially adapted to the speed requirement for the remaining machining operations on the same machine. This makes it possible for the diverse machining operations, such as, for example, turning and boring as well as thread whirling, to be carried out economically in one continuous operation on the same machine.

A further object of the invention is the improvement of the known method of whirling threads or worms in such a manner that threads or worms are obtained on high speed workpieces having a profile and precision technically and economically superior to threads or worms as obtained by thread whirling as known heretofore or by the conventional screw cutting operation involving a continuous cut either by turning or chasing (i.e. turning in a cycle).

A still further object of the invention is to improve the known whirling method in such a manner that it is also possible in the same short time to whirl multiple threads or multiple worms of high precision, i.e. that it is necessary only to travel once along the workpiece.

Finally it is an object of the invention to improve the known arrangements for whirling threads in such a manner that it is possible with the improved arrangement and in the workpiece not only to produce single and multiple, but also plain polygons and polygonal threads having a steep pitch.

According to the invention the rotary speed of the tool is selected to equal: the rotary speed of the workpiece, a whole numbered multiple thereof, or a fraction of the workpiece rotary speed resulting in a whole number, each of these selected values being increased, or reduced, by an amount proportional to the cutting angle expressed in r.p.m., which ensures that each cut of the tool joins the previous cut and thus achieves a continuous and smooth thread. Thus the rotary speeds of the workpiece and tool are selected to be proportional to one another, the speed of one being then modified by an amount proportional to the cutting angle. The cutting angle by definition is the arcuate angle along which the tool makes spaced cuts about the circumference of the workpiece in relation to the preceding cut according to the following formula, $$\frac{\text{cutting angle}}{360°} = \frac{\text{cutting span}}{\text{circumference of workpiece}}$$

or the $$\text{cutting angle} = \frac{(360°) \text{ cutting span}}{\text{circumference of workpiece}}$$

or, expressed in terms of one revolution, the $$\text{cutting angle} = \frac{\text{cutting span}}{\text{circumference of workpiece}}$$

This cutting angle must be converted to an amount defined in revolutions per minute to add or subtract this amount from the revolutions of the tool.

Thus a desired amount X by which the revolutions per minute of the tool must be increased, or decreased, is determined by multiplying by the revolutions of the workpiece, resulting in the following formula:

$$X = \frac{\text{Length of cutting span} \times \text{revolutions/min. of workpiece}}{\text{circumference of workpiece}}$$

The value X is therefore in r.p.m.'s and can be added to, or subtracted from, the revolutions of the tool without any difficulty.

In the method according to the invention the workpiece and tool are preferably contra-rotating. The required high linear cutting speed is then obtained by appropriate dimensioning the diameter of the tool path. In order to ensure with contra-rotating operation that cutting always starts at the uncut, thick end of the shaving to be cut, i.e. to obtain the beginning of the cut at the still unmachined circumference of the workpiece, the rotary speed of the tool, selected as described above, equal to the rotary speed of the workpiece, to a multiple, or a fraction of this speed, is reduced by said amount corresponding to the cutting angle. Starting to cut from the thick end preserves the cutting tool, ensures a favorable tool life for the thread whirling and permits precise and smooth threads to be obtained.

If the tool is allowed to operate at a fraction of the speed of the workpiece equal to a whole number and this speed is reduced or increased by an amount corresponding to the cutting angle, then a multiple thread i.e. a multi-start thread is obtained. The speed of the lathe in this case is also maintained at a high value. Multi-start threads of incomparable accuracy of pitch which hitherto has never been obtained may be produced by working with several whirling tools if the speed of the tool carrier is adapted in accordance with the invention and an evenly divided workpiece is machined with an uneven number of tools or an unevenly divided workpiece with an even number of tools. By the term "division" is intended the number of threads allotted to the circumference of a workpiece in axial section. Thus, single, double, treble and quadruple threads have a division or pitch of 1 and/or 2 and/or 3 and/or 4. Thus each tool runs through each cutting path, so that a high accuracy of pitch and truth of thread profile is obtained.

The cutting speed difference may be obtained, for example, by means of gear wheels. According to a further feature of the invention it is possible, however, also to interpose a revolving screw mandrel or leader which corresponds in pitch and speed to the workpiece and thereby to displace the workpiece or the workpiece carrier in an axial direction when the workpiece is rotated in the leader. This axial displacement by means of the advancing rotation of the tool resulting therefrom then produces the increase or reduction of the cutting angle. If in this arrangement the axial advance is cut off then the revolving workpiece may be machined to form a polygon, in which the surfaces relative to the workpiece axis remains a constant spatial position over the whole length of the workpiece. A very slight advancing rotation of the workpiece results in a polygon thread of a high pitch.

Thus, in accordance with the invention it is possible with an automatic lathe supplemented with a whirling unit to produce threads in a simple manner and without considerable conversion, to bore, turn and to produce polygons.

The invention will be described further, by way of example, with reference to the accompanying drawings, in which:

FIG. 1 is a plan view of a known arrangement for whirling threads which, in this embodiment with corresponding modification of the gearing, is suitable for the method of the invention;

FIG. 2 is a side elevation of workpieces and tool, partly in section with details of the speed ratio for the purpose of explaining the invention;

FIG. 3 is a plan view of the workpiece and tool showing the cutting operation in the arrangement of FIG. 2;

FIG. 4 is a section showing an arrangement having an axially displaceable leader. With this arrangement it is possible not only to whirl threads and multi-start threads, but also polygons;

FIG. 5 is a diagrammatic showing of a single tool making a plurality of cuts in a workpiece and illustrating the cutting angle;

FIGS. 6 and 7 are diagrammatic views illustrating the use of a plurality of tools to obtain multiple threads.

FIG. 1 first of all serves to explain, by means of the U.S. patent specification No. 2,749,808, a known arrangement of a known whirling method for producing an external thread. On the lathe 10, only the left hand section thereof being shown, the motor 11 via a gear wheel transmission 12 drives the chuck 13 which grips one end of the workpiece 14. The workpiece 14 at the other, right hand, end is mounted overhung in a tailstock (not shown). The lead screw 17 is coupled in known manner with the gear wheel transmission 12 via a shaft, not shown, and the gear wheels 15 and 16. The lead screw 17 in known manner engages the carriage 19 adapted to slide along the bed 18, 18'. On the carriage 19 the tool support 20 is adapted to be adjusted at right angles to the bed 18, 18' and turned also in known manner by means of the toolpost swivel plate 21. A tool post 22 for the independent whirling unit is mounted over the swivel plate 21. The whirling unit consists of a driving motor 23 which via the gear wheel 24 drives the bell-shaped tool holder 25. This bell-shaped toolholder is mounted by means of ball bearings 26 so as to be rotatable in the toolpost 22 and, when the motor is running, revolves eccentrically about the workpiece 14. One or more tools 27 are clamped in the bell-shaped toolholder 25. The tool 27 rotates at high speed about the workpiece 14 which operates at a comparatively low speed and, drawn by the lead screw 17, cuts an external thread in known manner during its advance along the workpiece.

Since in these known methods the workpiece 14 revolves comparatively slow at a speed of approximately $n=15/min.$ whilst the tool 27 revolves at a speed of approximately $n=1200/min.$, it is not possible by means of this known method for the workpiece to be bored or have the end turned at the same time, because for these machining operations the workpiece 14 would have to have a speed of at least $n=600/min.$ For these other machining operations it is thus necessary to alter the transmission ratio of the change wheel transmission 12 on the lathe. This change-over is time consuming, prevents a rapid working cycle and increases the manufacturing costs. With this ratio of the tool speed of $n=1200/min.$ relative to the workpiece speed of $n=15/min.$ a good tool cutting speed of approximately 180 m./min. in known whirling methods is indeed obtained and this also results in a good tool life for tools of high speed steel, but it is not a suitable workpiece speed for other machining operations as well.

In the method in accordance with the invention, as shown in FIGS. 2 and 3, the rotary speed of the workpiece 14, $n=600/min.$, is selected so as to be suitable also for another machining operations whilst the rotary speed of the bell-shaped toolholder 25 selected so as to be of the same magnitude but reduced by the amount, i.e. $n=15/min.$ corresponding to the cutting angle, thus $n=585/min.$ The workpiece 14, i.e. a threaded spindle of a shaft is clamped in the chuck 13 of a lathe and thus revolves about the axis $Z_1$. The tool 27 is clamped in a bell-shaped toolholder 25a and revolves about the axis $Z_2$ and hence eccentrically in the opposite or contra-rotary direction about the workpiece 14. The tool 27 then cuts during each revolution of the workpiece 14 once in the circumference thereof to the full depth of the thread; owing to the lag of the tool the cut is always started at the full or thick end at $a$ and finished with the conveniently high cutting speed of approximately 120 m./min. at the reduced or thin end at $b$.

Therefore to produce an external thread on the workpiece 14 with the same cutting speed as hitherto the same whirling time is required and at the same time it is possible to machine in another manner the workpiece revolving at high speed without changing the speed.

A two-start or double thread of the same pitch is obtained in the arrangement of FIGS. 2 and 3 when the bell-shaped toolholder 25a is permitted to revolve twice as fast at $n=1170/min.$ or the workpiece at half the speed at $n=300/min.$ and simultaneously the distance of the centres $Z_1$ and $Z_2$ reduced to half the thread depth. Thus with each revolution of the workpiece 14 the tool 27 then cuts twice at points exactly diametrically opposite to one another. Corresponding steps allow triple, quadruple and quintuple threads and so forth to be obtained, which with a positive or non-slip drive of the workpiece 14 and the tool 27 have an accuracy of pitch not obtainable by screw cutting with a dividing head, index milling or self-generating milling, since both manufacturing errors of the dividing head and of the self-generating milling tool are eliminated.

FIG. 5 illustrates the cutting angle. If the first cut of the tool is at point A, then the second cut starts at point B. The arcuate distance between the points A and B is the cutting angle. FIG. 5 clearly shows why the revolutions of the tool must be increased or decreased. The cuts should follow one another as closely as possible. In FIG. 5 when revolutions of the tool are increased by amount X as explained above, the cuts follow one another in clockwise direction. If the revolutions of the tool are decreased by the amount X, then the cuts follow one another as to spacing, but counterclockwise. Decreasing of the revolutions of the tool by the amount X is important if workpiece and tool turn in opposite directions, because then the span is always cut from its thick end. This protects the tool.

In the embodiment it is not only possible to vary the difference in speed, but also the screw and leader or leading cam within wide limits and therefore produce multi-start driving worms and multi-start lead screws and conveying spindles having a high degree of dividing and pitch accuracy, if the bell-shaped toolholder 25a is replaced by a hollow tool shaft, for example, a tool ring.

FIG. 4 shows such an arrangement for machining a thirty-start light metal threaded holder of 1½" diameter, as used in photographic lenses. This workpiece 28 is mounted in a spring chuck 29 acting as the workpiece carrier, the shaft 30 of which having a thread 31 of a high pitch, is screwed into a leader 32 having an internal thread of the same pitch. The leader 32 is mounted in the spindle support 33 so as to be readily rotatable and driven positively via a gearing 34–38 with the tool 39. The tool 39 is mounted in a tool ring 40 inclined to the pitch of the intended thread and adapted to revolve eccentrically. The tool ring 40 by way of ball bearings 41 is mounted rotatably and pivotably in a setting slide vertically displaceable relative to the workpiece axis and driven by the bevel gear 43 via the gear ring 44.

To produce the thirty start lens thread the leader 32, and hence the workpiece 28, is given the speed $n=300/\text{min}$. and the tool ring 40 the speed $n=9000/\text{min}$. in the same rotary direction or contra-rotating. The increase of speed by the cutting angle is obtained by an axial displacement of the spring chuck 29 to the left caused by a rotation in the leader 32.

Axial displacement of the spring chuck 29 permits the depth of cut or cutting time to be varied. The axial displacement may be obtained by hydraulic or mechanical means. The internal thread of the leader 32 conveniently consists of deformable plastics material.

If the lead screw 31 on the spring leader shaft 30 and the leader 32 according to pitch, division and diameter is adapted uniformly to the thread of the workpiece 28, then it is also theoretically possible to provide an infinitely long workpiece (indicated in broken lines) with a single start thread by stopping the leader 32 and exclusively rotating the spring chuck 29 with an acurate pitch or to provide it with a multi-start leading thread by means of a corresponding speed ratio of the leader 32 relative to the tool ring 40. Despite this it is unnecessary to use a machine with a long bed.

When producing a triple-start worm of approximately 1½" and module 2.5 according to the method of the invention, the workpiece revolves at $n=1000/\text{min}$. A tool ring fitted with four cutting tools will then have to revolve at $n=750/\text{min}$. Each tool of the tool ring alternately travels through each thread path. In this way an accuracy of division is obtained which has not been achieved heretofore.

FIG. 6 refers to the whirling of a double thread (even number). For this purpose the tool holder 40 has 3 cutting tools (odd number) 45, 46, 47 arranged so as to be spaced 120 degrees apart from one another. If one selects for the workpiece 28 a velocity of 900 r.p.m., then one has to select 600 r.p.m. for the toolholder. According to FIG. 6, tool 45 in a certain phase cuts in the first thread path. When the workpiece 28 has moved in a certain time unit a distance of 180 degrees so that thread path II reaches the same point that was until then thread path I, then the tool holder 40 has moved in the same time unit a distance of 120 degrees so that the tool 46 reaches the same point previously occupied by tool 45 and cuts in the thread path II. After a further turn of the workpiece an additional 180 degrees, the tool 47 cuts in the thread path I.

To produce a triple thread one uses a toolholder 50 with four tools 48, 49, 50, 51 evenly spaced 90 degrees apart. If one selects for the workpiece a velocity of 1,000 r.p.m. then the toolholder 40 must be turned with a velocity of 750 r.p.m. In the example as drawn, tool 48 cuts in the thread path I. If the workpiece 28 is moved in a specified time unit a distance of 120 degrees so that the thread path II reaches the point previously occupied by thread path I, then the tool holder 40 moves in the same specified time unit a distance of 90 degrees so that tool 49 cuts in the thread path II instead of tool 48. After an additional movement of the workpiece 28 for a distance of 120 degrees, tool 50 cuts then in the thread path III.

I claim:

1. A method of whirling a thread on a workpiece comprising the steps of rotating a workpiece member about an axis at a high speed suitable for conventional lathe operations such as turning and boring and at least 300 r.p.m., and subjecting the workpiece member to intermittent cutting action of a tool member rotating eccentrically about said workpiece axis at a speed proportional to the speed of the workpiece member, the speed of one of said members being modified by an amount proportional to the cutting angle expressed in revolutions per minute.

2. A method of whirling a thread on a workpiece according to claim 1 wherein the speed of said tool member is equal to the speed of the workpiece member reduced by said amount proportional to the cutting angle of said tool member.

3. A method of whirling a thread on a workpiece according to claim 1 wherein the speed of said tool member is equal to the speed of the workpiece member increased by said amount proportional to the cutting angle of the tool member.

4. A method of whirling a thread on a workpiece according to claim 1 wherein the speed of said tool member is a multiple of the speed of the workpiece member reduced by said amount proportional to the cutting angle of the tool member.

5. A method of whirling a thread on a workpiece according to claim 1 wherein the speed of said tool member is a multiple of the speed of the workpiece member increased by said amount proportional to the cutting angle of the tool member.

6. A method of whirling a thread on a workpiece according to claim 1 wherein the speed of said tool member is a fraction of the speed of the workpiece member reduced by said amount proportional to the cutting angle of said tool member.

7. A method of whirling a thread on a workpiece according to claim 1 wherein the speed of said tool member is a fraction of the speed of the workpiece member increased by said amount proportional to the cutting angle of said tool member.

8. A method of whirling a multi-start thread on a workpiece comprising the steps of rotating the workpiece about an axis at a rotary speed suitable for conventional lathe operations such as turning and boring and at least 300 r.p.m., and subjecting the workpiece to intermittent cutting action of a plurality of tools rotating in a common plane and eccentrically about said workpiece axis.

9. A method of whirling a multi-start thread on a workpiece comprising the steps of rotating the workpiece about an axis at a rotary speed suitable for conventional lathe operations such as turning and boring and at least 300 r.p.m., and subjecting the workpiece to intermittent cutting action of an odd number of tools rotating in a common plane and eccentrically about said workpiece axis for forming an even number of multiple start threads on said workpiece.

10. A method of whirling a multi-start thread on a workpiece comprising the steps of rotating the workpiece about an axis at a rotary speed suitable for conventional lathe operations such as turning and boring and at least 300 r.p.m., and subjecting the workpiece to intermittent cutting action of an even number of tools rotating in a common plane and eccentrically about said workpiece axis for forming an odd number of multiple start threads on said workpiece.

References Cited by the Examiner

UNITED STATES PATENTS

| | | | |
|---|---|---|---|
| 1,365,954 | 1/21 | Richards | 90—11.42 |
| 1,512,520 | 10/24 | Burt et al. | 90—11.64 X |
| 2,191,777 | 2/40 | Stone | 90—11.42 |
| 2,403,075 | 7/46 | Green | 90—11.62 |
| 2,691,921 | 10/54 | Burgsmuller | 90—11.64 |
| 2,749,808 | 6/56 | Burgsmuller | 82—5 X |
| 2,923,206 | 2/60 | Kovac | 90—11.62 |
| 2,979,993 | 4/61 | Hedstrom | 90—11.42 |

FOREIGN PATENTS 731,810   6/55   Great Britain.

WILLIAM W. DYER, Jr., *Primary Examiner.*

J. SPENCER OVERHOLSER, *Examiner.*